(12) United States Patent
Honda et al.

(10) Patent No.: US 6,982,760 B1
(45) Date of Patent: Jan. 3, 2006

(54) DISPLAY DEVICE FOR CAMERA USING ORGANIC EL ELEMENT

(75) Inventors: Sumito Honda, Hachioji (JP); Tsuyoshi Yaji, Kawagoe (JP); Yuji Imai, Higashiyamato (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/461,932

(22) Filed: Dec. 15, 1999

(30) Foreign Application Priority Data

Dec. 16, 1998 (JP) .................................. 10-357641

(51) Int. Cl.
*H04N 5/222* (2006.01)
*G09G 3/20* (2006.01)

(52) U.S. Cl. ..................................... 348/333.02; 345/77

(58) Field of Classification Search ........... 348/333.01, 348/333.02, 333.04, 333.11, 333.12, 333.03, 348/333.05, 333.06, 333.07, 333.08, 333.09, 348/333.1, 333.13; 313/500, 504, 505, 506, 313/510; 345/33, 36, 55, 76, 77, 78, 79, 345/80, 81, 82, 83; 396/281, 282, 287, 289, 396/291, 292, 296, 374; 386/118
See application file for complete search history.

(56) References Cited

U.S. PATENT DOCUMENTS

| 5,298,936 A | * | 3/1994 | Akitake et al. ............... 396/85 |
| 5,432,578 A | * | 7/1995 | Suzuki ....................... 396/281 |
| 5,652,930 A | * | 7/1997 | Teremy et al. .............. 396/287 |
| 5,659,817 A | * | 8/1997 | Fujino et al. ............... 396/137 |
| 5,977,704 A | * | 11/1999 | Shi et al. ..................... 313/504 |
| 6,021,280 A | * | 2/2000 | Osato et al. ................. 396/287 |
| 6,151,451 A | * | 11/2000 | Yukitake et al. .............. 396/56 |

FOREIGN PATENT DOCUMENTS

JP         8-82841         3/1996

* cited by examiner

*Primary Examiner*—Wendy R. Garber
*Assistant Examiner*—Justin Misleh
(74) *Attorney, Agent, or Firm*—Straub & Pokotylo; John C. Pokotylo (57) ABSTRACT

A display device or a camera includes an organic electroluminescent element emitting multiple color lights. A driving condition setting circuit sets data corresponding to driving conditions for driving the organic electroluminescent element. A drive circuit drives the organic electroluminescent element on the basis of the driving conditions set by the driving condition setting circuit.

57 Claims, 11 Drawing Sheets

DISPLAY DEVICE FOR CAMERA USING ORGANIC EL ELEMENT

BACKGROUND OF THE INVENTION

The present invention relates to a display device for a camera using an organic electroluminescent element (herein, referred to as organic EL element) which can emit multiple color lights or polychromatic lights.

Nowadays, as improvement in function and multi-function of a camera is advanced, it becomes necessary to display much information on a display section of the camera. Simultaneously therewith, there is a tendency that downsizing of a camera is promoted and thereby the size of the display section is limited so that individual display segments in the display section are made small. Under these conditions, various technical developments have been made in order to realize display obvious or easy to understand for a photographer of a camera.

Herein, in Jpn. Pat. Appln. KOKAI Publication No. 8-82841, for example, there has been disclosed a technique regarding a display device for a camera where a display is made easy to understand by changing colors of back light of a display section or display segments. That is, the technique is characterized in that a control circuit controls the contents of display of a display device comprising a liquid crystal display panel and controls respective colors which are generated by back light means comprising red, blue and green LEDs according to output signals from a back light driver to change the back light color of the display device for display, so that various displays can easily be distinguished or identified from one another.

In the above conventional art, however, there occur the following problems.

Namely, there is a problem that a display on the display section becomes difficult to understand for a photographer when a photograph is taken in a room illuminated with the same color as the color of the display section. Furthermore, there also occurs a problem that, since colors on the display section regarding the display corresponding to respective operation modes of the camera are preliminarily determined, an image of a photographer to each operation mode does not correspond to the actual color on the display section in each operation mode, so that the photographer feels incompatibility.

BRIEF SUMMARY OF THE INVENTION

In view of the above, an object of the present invention is to provide a display device for a camera which allows display easy to understand or obvious for a photographer without giving an incompatible feeling to the photographer.

In order to achieve the above object, a display device for a camera according to a first aspect of the invention comprises:
an organic electroluminescent element for emitting multiple color lights;
driving condition setting means for changing driving conditions for driving the organic electro-luminescent element; and
driving control means for driving the organic electroluminescent element on the basis of the driving conditions set by the driving condition setting means.

A display device for a camera according to a second aspect of the invention comprises:
an organic electroluminescent element for emitting multiple color lights;
driving condition setting means for changing driving conditions for driving the organic electro-luminescent element;
storing means for storing the driving conditions set by the driving condition setting means; and
driving control means for driving the organic electroluminescent element on the basis of the driving conditions stored in the storing means.

A camera according to a third aspect of the invention comprises:
an organic electroluminescent element for emitting multiple color lights;
driving condition setting means for changing driving conditions for driving the organic electroluminescent element; and
a display device for displaying that setting the driving conditions by the driving condition setting means is enabled or allowable.

Also, a display device for a camera according to a fourth aspect of the invention comprises:
an organic electroluminescent element for emitting multiple color lights;
a driving condition setting circuit setting data corresponding to driving conditions of the organic electroluminescent element; and
a display device displaying that setting the driving conditions by the driving condition setting circuit is allowed.

A display device for a camera according to a fifth aspect of the invention comprises:
a display section including an organic EL element for emitting multiple color lights;
a first driving condition setting section for setting luminous brightness of the organic EL element;
a second driving condition setting section for setting luminous color of the organic EL element; and
a driving control section driving the organic EL element on the basis of the driving conditions set by the first driving condition setting section and the second driving condition setting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be explained with reference to the drawings.

Figure 1:
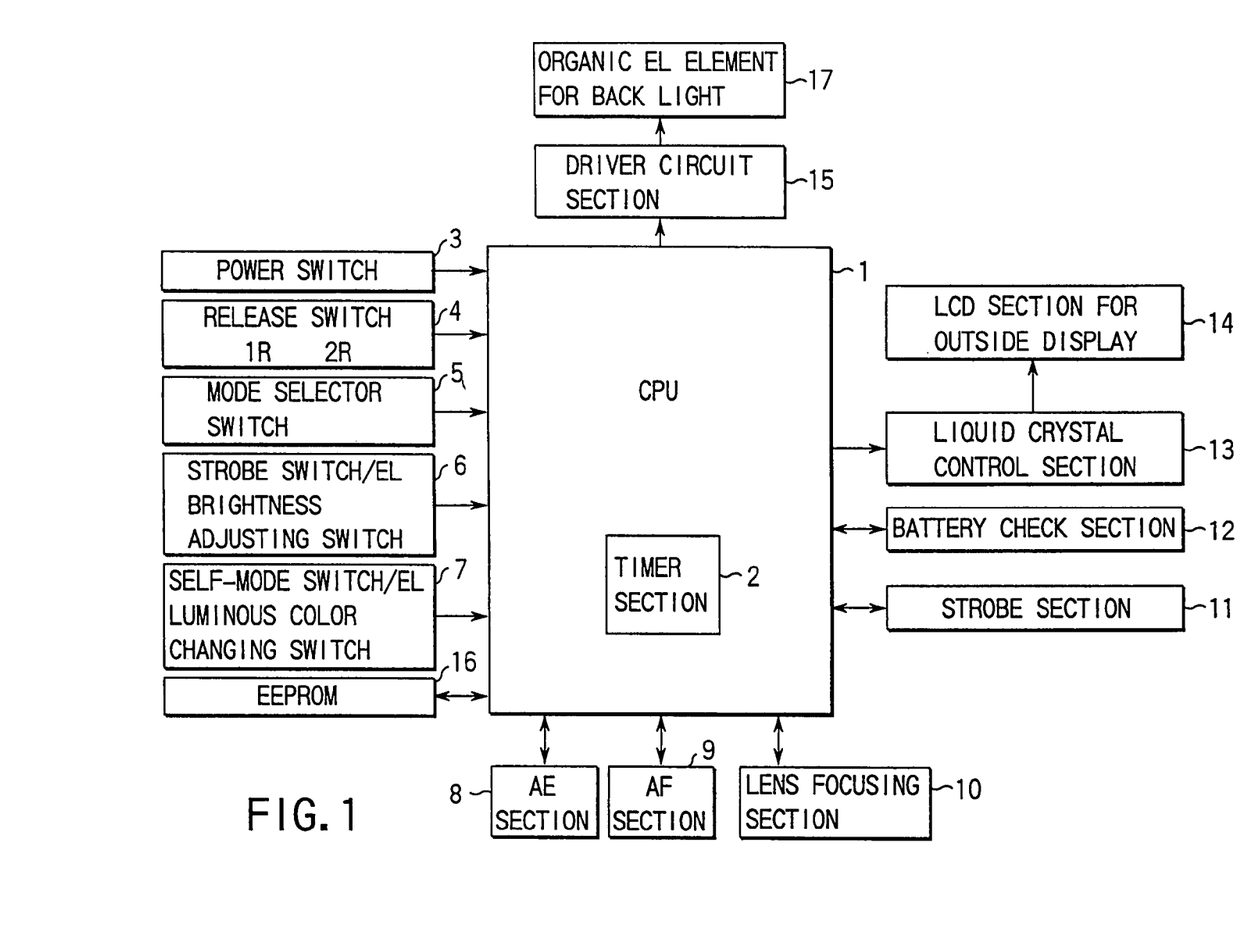
FIG. 1 is a block diagram showing a configuration of a camera adopting a display device for a camera according to a first embodiment of the present invention.

FIG. 1 is a block diagram showing a configuration of a camera adopting a display device for a camera according to a first embodiment of the invention.

In FIG. 1, a central processing unit (CPU; Central Processing Unit) 1 controls various operations of a camera and it includes a timer section 2 for counting predetermined times therein.

Connected to the CPU 1 are a power switch 3, a release switch 4, a mode selector switch 5 for performing switching between a photographing mode and an EL setting mode, a strobe switch 6 for switching photographing modes at a time of the photographing mode (also serving as an EL brightness adjusting switch for adjusting a brightness of an organic EL element at a time of an EL setting mode), and a self-mode switch 7 for switching self-mode at a time of the photographing mode (also serving as an EL luminous color changing switch for changing luminous colors at a time of the EL mode setting mode).

The release switch 3 is constituted such that the 1st release (1R) is turned on when a release button is half pressed and the 2nd release (2R) is turned on when the release button is fully pressed.

Also, connected to the CPU 1 are a strobe section 11 which is controlled by the CPU 1 on the basis of the measured results obtained by an AE section 8, if necessary, and a lens focusing section 10 which is focus-controlled by the CPU 1 on the measured results obtained by an AF section 9. Furthermore, an EEPROM 16 in which information such as numbers of frames, photographic modes and the like are stored, an organic EL element 17 for back light and a LCD section 14 for outside display are respectively connected to the CPU 1 through a driver circuit section 15 and a liquid crystal control section 13.

Figure 2:
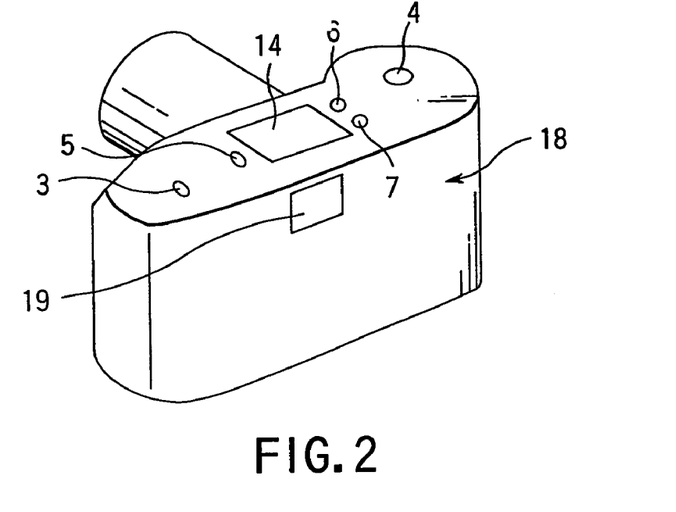
FIG. 2 is a perspective appearance view of the camera according to the first embodiment.

Next, FIG. 2 is a perspective appearance view of the camera according to the first embodiment.

As shown in FIG. 2, a finder 19 is provided at a back of a camera body 18, and the LCD section 14 for outside display is disposed at a central section of an upper face of the camera body 18. Also, the release switch 4 and the power switch 3 are arranged at both sides on the upper face of the camera body 18. Furthermore, the mode selector switch 5, and the strobe switch (EL brightness adjusting switch) 6 and the self-mode switch (EL luminous color changing switch) 7 are respectively disposed adjacent to both sides of the LCD section 14 for outside display.

Figure 3:
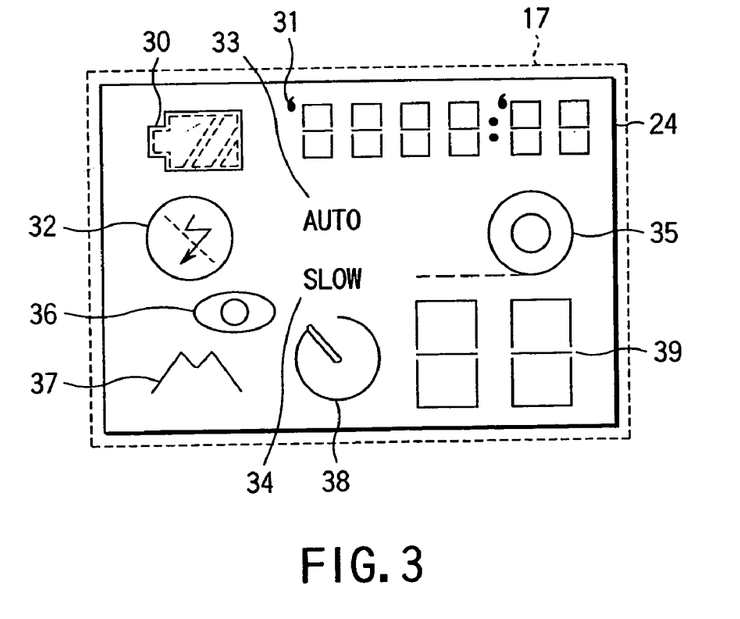
FIG. 3 is a view showing all segments displayed on a LCD section 14 for an external display.

Next, all segments displayed on the above LCD section 14 for outside display will be explained with reference to FIG. 3. A battery check mark 30, a photographing date and hour 31, a strobe light-emitting (light-emitting prohibition) mode mark 32, full auto-mode mark 33, slow mode mark 34, a film loading/winding/rewinding mark 35, a red-eye reducing mode mark 36, a scene mode mark 37, a self-timer mode mark 38, and a film frame number 39 are displayed on the LCD section 14 for outside display. An organic EL element 17 for back light (corresponding to a region shown in a broken line in FIG. 3) is disposed below these display segments.

An operation sequence of the camera according to the first embodiment will be explained below with reference to a flowchart shown in FIG. 4.

When the camera is actuated by turning on the power switch 3, the CPU 1 first initializes respective sections of the camera (Step S1). Next, the CPU 1 reads information about the camera such as the number of frames, a photographing mode, and the like from EEPROM 16 (Step S2), and it performs display on the LCD section 14 on the basis of the information read out (Step S3). Furthermore, the CPU 1 causes the organic EL element 17 for back light to emit on the basis of the information read out in Step S2 (Step S4).

Next, the CPU 1 confirms a state of the power switch 3 (Step S5), and the CPU 1 terminates processing to stop operation of the camera, when the power switch 3 is off. On the contrary, when the power switch 3 is on, the CPU 1 determines whether or not the mode selector switch 5 is turned on (Step S6), and the control routine proceeds to Step 10 when the mode selector switch 5 is off.

On the other hand, in Step S6, when the mode selector switch 5 is turned on, the CPU 1 determines whether the current mode is the photographing mode or the EL setting mode (Step S7). When the current mode is the photographing mode, the CPU 1 changes the current mode to the EL setting mode (Step S8), and when the current mode is the EL setting mode, it changes the current mode to the photographing mode (Step S9). Sequentially, the CPU 1 performs a subroutine [photographing mode setting] described in detail below (Step S10), and further performs a subroutine [EL driving condition setting] described in detail below to set the luminous brightness and luminous color of the organic EL element 17 for back light (Step S11).

Sequentially, the CPU 1 determines whether or not the 1R (the 1st release) of the release switch 4 is on (Step S12), and when the release switch 4 is not turned on, the control routine returns to the Step S3 again to wait until the 1st release is turned on. On the other hand, when the 1R of the release switch 4 is turned on, the CPU 1 performs photometry and range finding with the AE section 8 and the AF section 9 (Step S13).

Next, the CPU 1 determines whether or not the 1R of the release switch 4 is on again (Step S14). When the 1R is not on, the control routine returns to the Step S3 and, when it is on, the CPU 1 determines whether or not the 2R (2nd release) of the release switch 4 is on (Step S15). When the 2R is not on, the control routine returns to the Step S14, and when it is turned on, a predetermined photographing action or operation is performed (Step S16). Thus, when the photographing action is completed, the control routine returns to the Step S3 and waits until a switch is input or turned on again.

Next, detailed operation of a subroutine [photographing mode setting] executed in Step 10 in FIG. 4 will be explained with reference to a flowchart of FIG. 5.

First, the CPU 1 determines whether or not the current mode is the photographing mode (Step S21).

Figure 4:
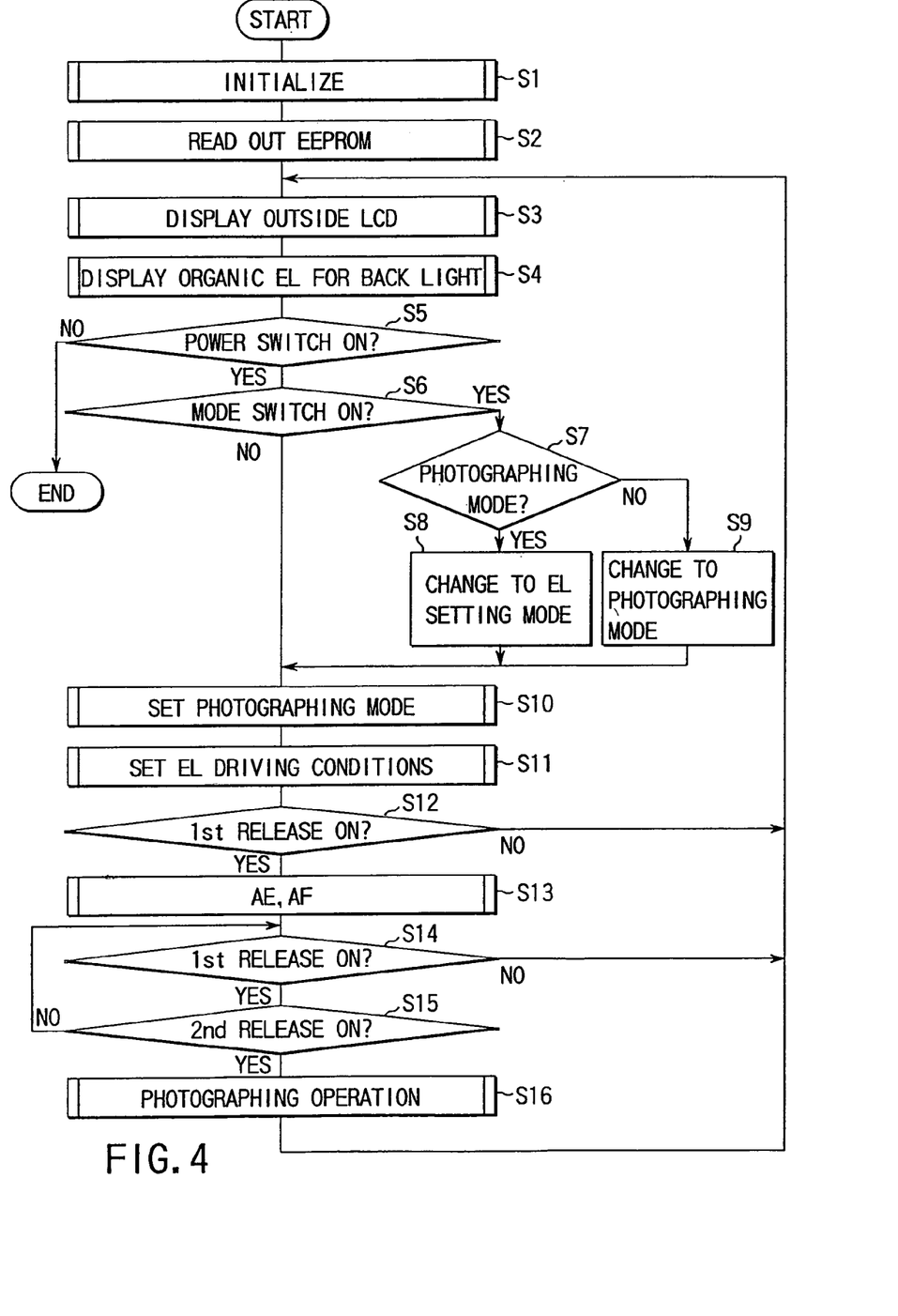
FIG. 4 is a flowchart for explaining an operation sequence effected by the camera according to the first embodiment.
Figure 5:
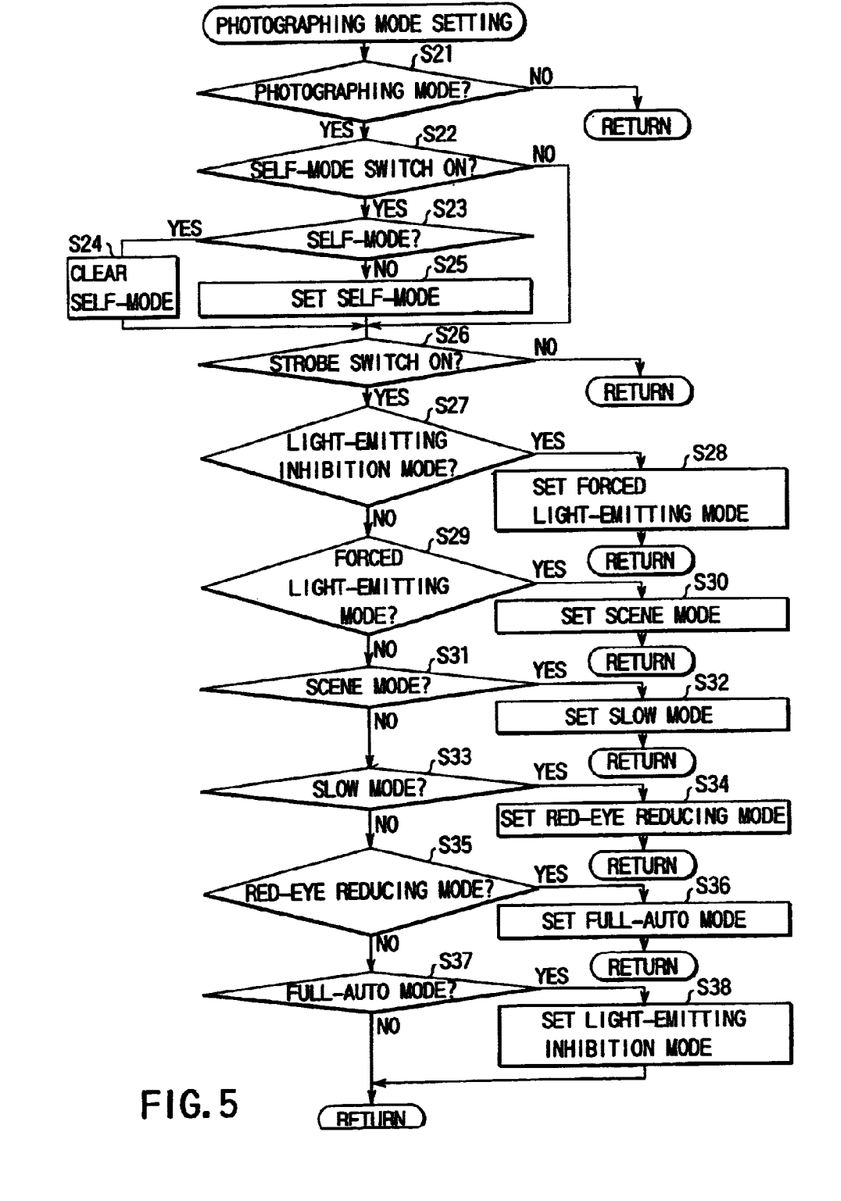
FIG. 5 is a flowchart showing for explaining a detailed operation of a subroutine [setting of photographing mode] performed at Step S10 in FIG. 4.

Here, when the current mode is not the photographing mode, this subroutine is terminated and the control routine returns to processings of Step S11 on of FIG. 4. On the contrary, when the current mode is the photographing mode, the CPU 1 determines whether or not the self-mode switch 7 is on (Step S22). Here, when the self-mode switch 7 is off, the control routine proceeds to Step S26, and when it is on, the CPU 1 determines whether or not the current mode is the self-mode (Step S23).

When the current mode is the self-mode in the Step S23, the CPU 1 clears the self-mode (Step S24), and when it is not the self-mode, the CPU 1 sets the current mode to the self-mode (Step S25) and it determines whether or not the strobe switch 6 is on (Step S26). Here, when the strobe switch 6 is off, the processing of this subroutine is terminated.

When the strobe switch 6 is on in the Step S26, the CPU 1 determines whether or not the current mode is a light-emitting inhibition mode (Step S27). Here, when the current mode is the light-emitting inhibition mode, the CPU 1 sets the current mode to a compulsory or forced light-emitting mode (Step S28) to terminate this subroutine. On the other hand, when the mode is the light-emitting inhibition mode, the CPU 1 determines whether the mode is not the forced light-emitting mode (Step S29). Here, when the mode is the forced light-emitting mode, the CPU 1 sets the mode to a scene mode (Step S30) and terminates this subroutine.

In the Step S29, when the current mode is not the forced light-emitting mode, the CPU 1 determines whether or not the current mode is the scene mode (Step S31). When the current mode is the scene mode, the CPU 1 sets the mode to a slow mode (Step S32) and terminates this subroutine. In the Step S31, when the current mode is not the scene mode, the CPU 1 determines whether or not the current mode is the slow mode (Step S33). When the mode is the slow mode, the CPU 1 sets the mode to a red eye-reducing mode (Step S34) and terminates this routine. In the Step S33, when the mode is not the slow mode, the CPU 1 determines whether or not the mode is the red eye reducing mode (Step S35). When the mode is the red-eye reducing mode, the CPU 1 sets the mode to a full auto-mode (Step S36) and terminates this subroutine. In the Step S35, when the mode is not the red-eye reducing mode, the CPU 1 determines whether or not the mode is the full auto-mode (Step S37). When the current mode is the full auto-mode, the CPU 1 set the mode to the light-emitting inhibition mode (Step S38) and terminates this subroutine. In the Step S37, when the mode is not the full auto-mode, the CPU 1 holds this mode to terminate this subroutine.

Figure 6:
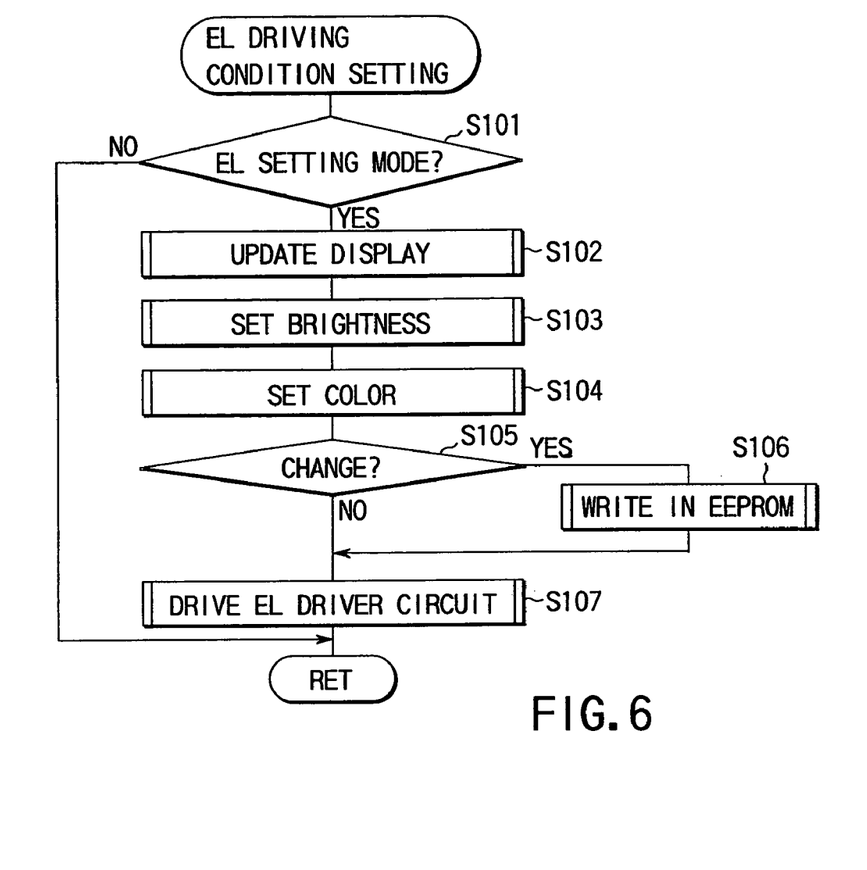
FIG. 6 is a flowchart for explaining an operation of a subroutine [setting of EL driving conditions] performed at Step S11 in FIG. 4.

Next, operation of the subroutine [EL driving condition setting] executed in the Step S11 of FIG. 4 will be explained with reference to a flowchart of FIG. 6.

Figure 7:
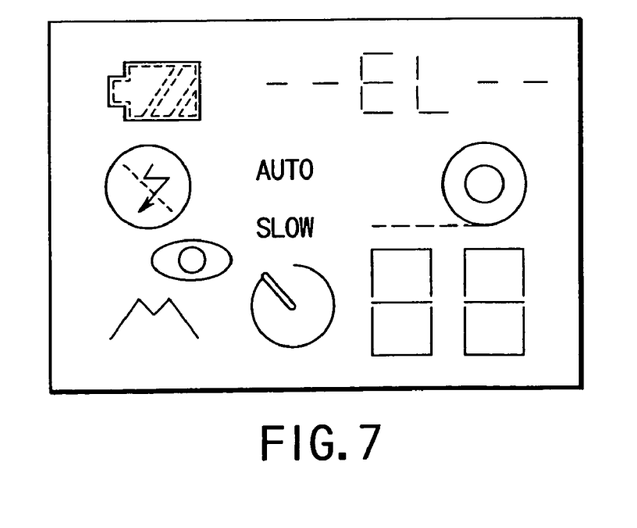
FIG. 7 is a view showing an aspect where a photographing date and hour displaying section is displayed in an EL setting mode.

First, the CPU 1 determines whether or not the current mode is an EL setting mode (Step S101). Here, when the mode is not the EL setting mode, the CPU 1 terminates this subroutine. On the other hand, when the mode is the EL setting mode, the CPU 1 displays an EL setting mode on the photographing date and hour display section of the LCD section 14 for outside display (refer to FIG. 7) in order to inform a photographer that the EL setting mode has been set (Step S102).

Then, the CPU 1 executes a subroutine [brightness setting] described in detail later, where brightness setting processing is performed such that a photographer can set luminous brightness of the organic EL element 17 (Step S103), and the CPU 1 executes a subroutine [color setting] described in detail later, where color setting processing is performed such that a photographer can set luminous color of the organic EL element 17 (Step S104). Next, after the above respective setting processings, the CPU 1 determines whether or not the setting change has been performed (Step S105). When the CPU 1 determines that the setting change has been performed, it writes changed data into the EEPROM 16 (Step S106). Next, when it is determined in the Step 105 that the setting change has not been performed, the control routine proceeds to Step S107, where the driver circuit 15 of the organic EL element 17 for back light is driven under the set conditions, and the control routine returns to the processings of Step S12 and on of the FIG. 4.

Figure 8:
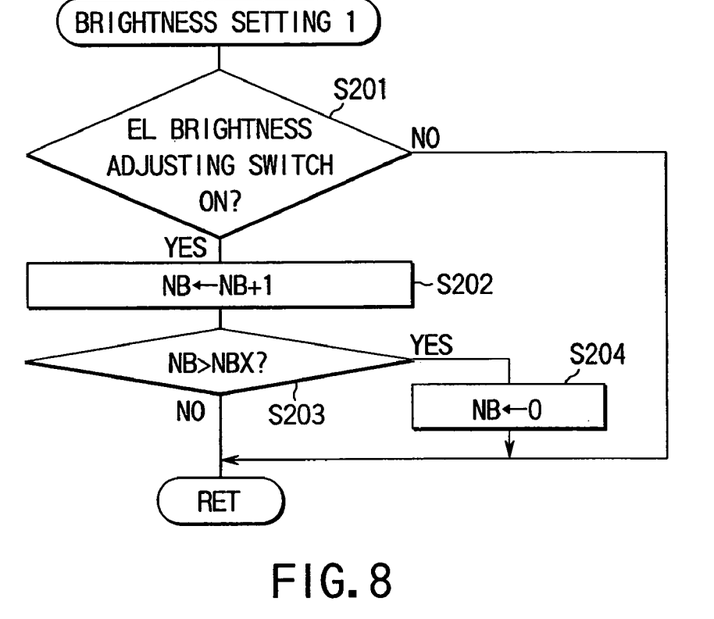
FIG. 8 is a flowchart for explaining an operation of a subroutine [brightness setting] performed at Step S103 in FIG. 6.

Next, operation of the subroutine [brightness setting] executed in the Step S103 of FIG. 6 will be explained with reference to a flowchart of FIG. 8.

In this subroutine, when a photographer selects the EL setting mode with the mode selector switch 5, the strobe switch 6 and the self-mode switch 7 are respectively switched to the EL brightness adjusting switch 6 and the EL luminous color changing switch 7 functionally.

That is, the CPU 1 checks whether or not the EL brightness adjusting switch 6 has been input or turned on (Step S201), and it terminates the processing when the switch 6 has not been input. On the other hand, when the switch 6 has been input, the CPU 1 increases or increments a count value NB representing a luminous brightness adjusting level by +1 (Step S202). Sequentially, the CPU 1 checks whether or not the NB is larger than the maximum value NBX in a luminous brightness adjustable range (Step S203), and the NB is reset to [0] which is the minimum value in the luminous brightness adjustable range again when the former is larger than the latter (Step S204). In the above Step S203, when the NB is less than the NBX or after the processing in the Step S204 is performed, the CPU 1 terminates this processing.

Here, for example, the NB takes a value for each count form 0 (OFF) up to 5 (=NBX) and the CPU 1 confirms this each count value to control the driver circuit 15 so as to change bias voltage (Vb) described later in FIG. 10B according to the value, thereby changing the luminous brightness of the organic EL element 17 for back light.

Figure 9:
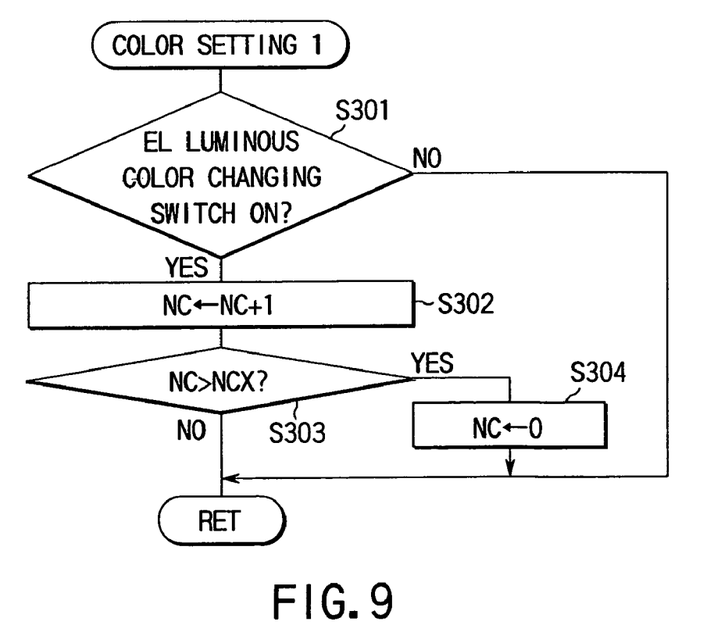
FIG. 9 is a flowchart for explaining an operation of a subroutine [color setting] performed at Step S104 in FIG. 6.

Next, the subroutine [color setting] executed in the Step S104 of FIG. 6 will be explained with reference to a flowchart of FIG. 9.

First, the CPU 1 checks whether the EL luminous brightness changing switch 7 has been input or turned on (Step S301) to terminate the processing when not.

On the other hand, when the EL luminous color changing switch 7 has been input or turned on, the CPU 1 increases or increments the count value NC representing the luminous color adjusting level by +1 (Step S302). Sequentially, the CPU 1 checks whether or not the NC is larger than the maximum value NCX which is adjustable in a luminous color adjustable range (Step S303), and resets it to [0] which is the minimum value in the luminous color adjustable range again when larger (Step S304). In the Step S303, when the NC is the NCX or less or after the processing in the Step S304 is terminated, the CPU 1 terminates this processing.

Figure 10A:
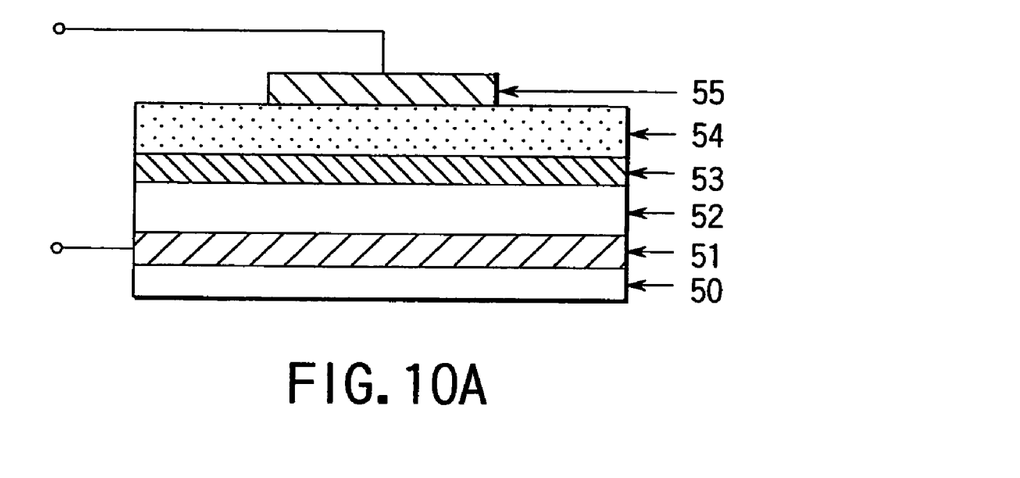
FIG. 10A is a view showing one example of a structure of an organic EL element emitting two color lights.
Figure 10B:
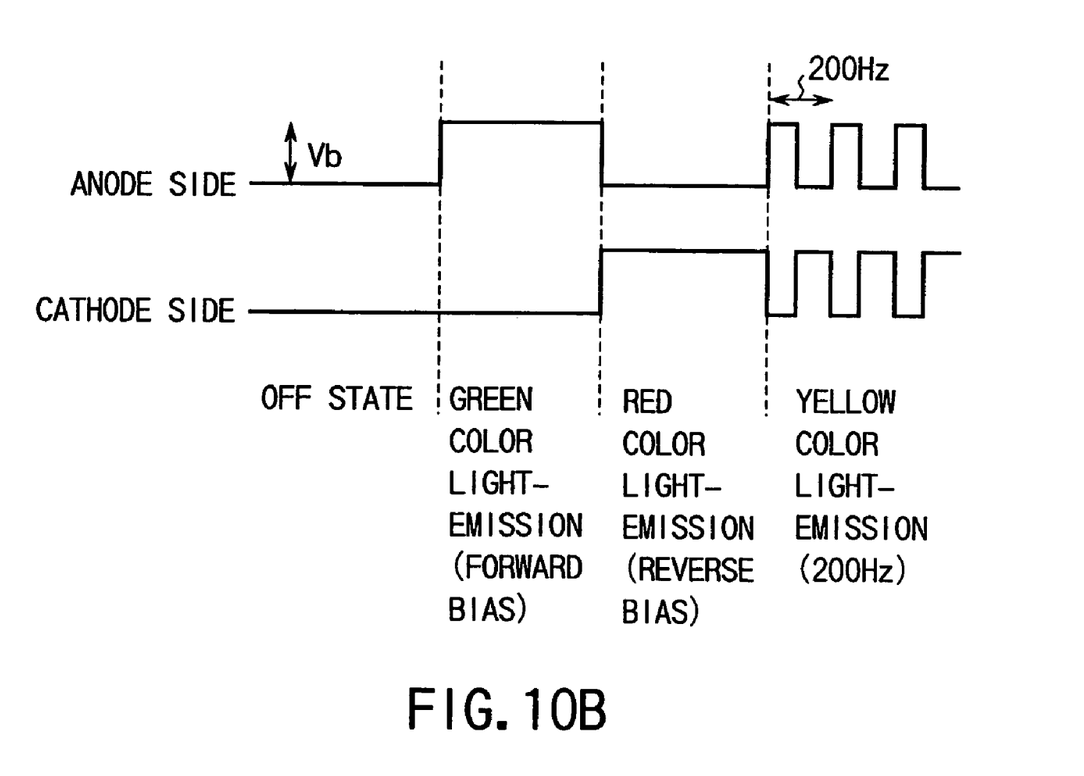
FIG. 10B is a diagram showing waveforms of a light-emitting control signal.

Here, for example, the NC takes the values 0 to 2, and the CPU 1 confirms the count value such that 0 becomes green color, 1 becomes red color and 2 becomes yellow color to control the driver circuit 15 so as to output waveforms such as shown in FIG. 10B described later according to the count value, thereby changing the luminous color of the organic EL element 17 for back light.

Here, FIG. 10A shows one example of a structure of an organic EL element emitting two color lights. As shown in FIG. 10A, an element structure has a structure where luminous layer section is sandwiched between an anode and a cathode on a glass substrate 50. The anode is constituted with a transparent electrode 51 and the cathode is constituted with a metal electrode 55. The luminous layer section has a three-layered structure of a green color luminous layer 54 made of material emitting green color light at a forward bias time, a red color luminous layer 52 made of material emitting red color light at a reverse bias time and a carrier blocking layer 53.

In such a structure, as shown in FIG. 10B, in a case of green color light emission, +Vb (about 5V) and 0V are respectively applied to the anode and the cathode. In a case of red color light emission, 0V and +Vb are respectively applied to the anode and the cathode. In a case of yellow light emission, forward bias and reverse bias are alternately driven at a frequency of about 200 Hz in a time dividing manner to produce color light mixture in order to prevent flickering to eyes.

As mentioned above, according to the first embodiment, a photographer operates the mode selector switch 5 to select the EL setting mode and turn on the EL brightness adjusting switch 6 according to a photographing environment or his/her taste so that the luminous brightness of the organic EL element 17 for back light can be changed, and the EL luminous color changing switch 7 is turned on so that the luminous color of the organic EL element 17 for back light can be changed. Also, since the setting conditions are stored in the EEPROM 16, even when the power supply is interrupted once, it is unnecessary to set the conditions again and the luminous brightness and the luminous color which have been set previously can be regenerated or reproduced.

Next, a second embodiment of the present invention will be explained in detail.

Incidentally, a configuration of a camera adopting a display device for a camera according to the second embodiment is similar to that explained in FIG. 1, and detailed explanation thereof is omitted. Same members in this embodiment are explained with same reference numerals as those in FIG. 1.

Figure 11:
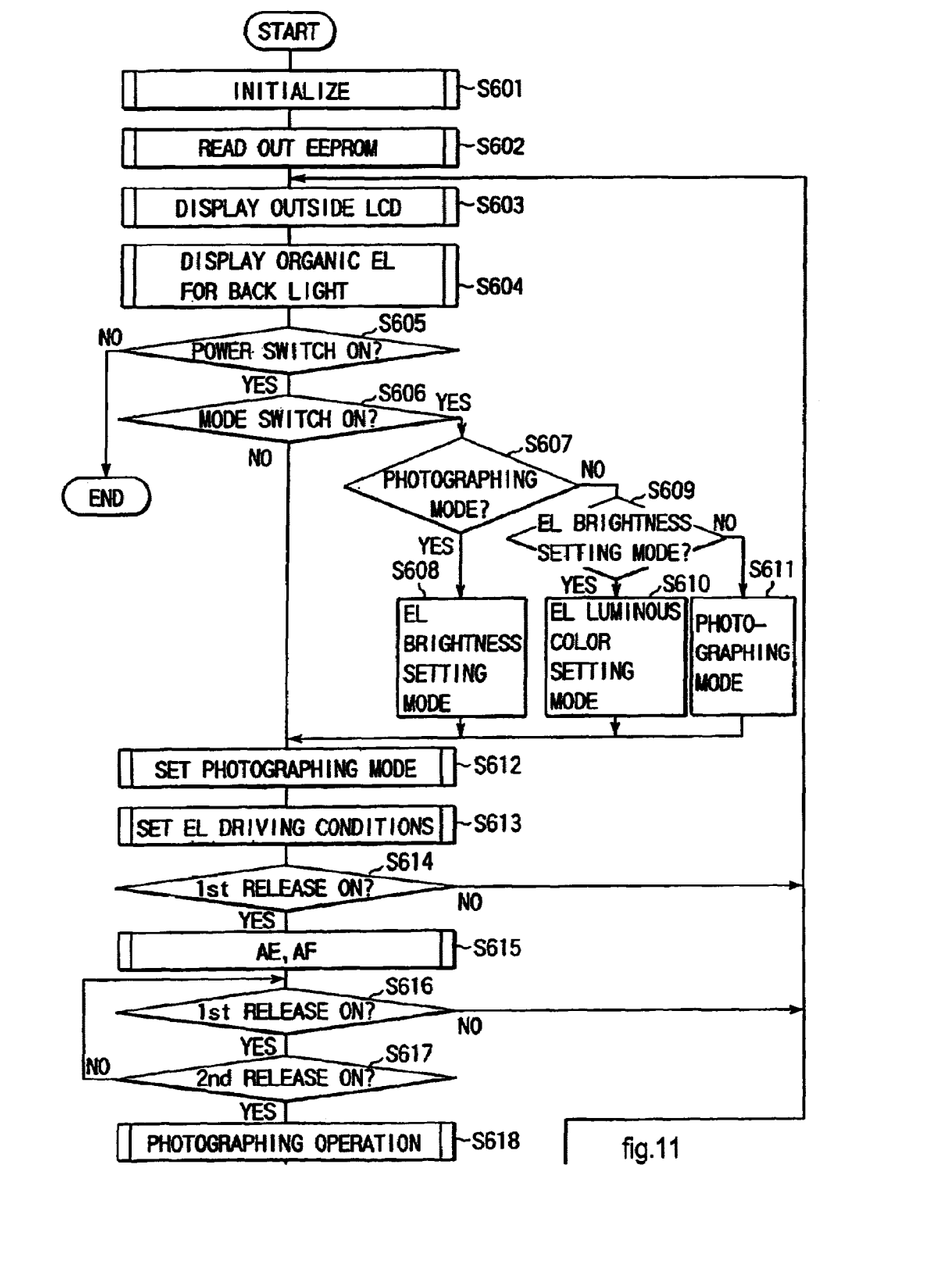
FIG. 11 is a flowchart for explaining an operation sequence of a camera according to a second embodiment in detail.

Operation sequence of the camera according to the second embodiment will be explained in detail with a flowchart of FIG. 11.

Incidentally, since processings are similar to those in FIG. 4 except for the processing performed when the mode switch 5 is turned on in the Step S606, only different steps will be explained.

In Step S606, when the mode switch 5 is turned on, the CPU 1 determines whether the current mode is the photographing mode (Step S607). Here, in the case of the photographing mode, the CPU 1 performs mode change to the EL brightness setting mode (Step S608).

When it is determined in the Step S607 that the current mode is not the photographing mode, the CPU 1 determines whether or not the current mode is the EL brightness setting mode (Step S609). Here, in the case of the EL brightness setting mode, the CPU 1 performs mode change to the EL luminous color setting mode (Step S610). When it is determined in the Step S609 that the current mode is not the EL brightness setting mode, the CPU 1 performs setting to the photographing mode (Step S611).

Figure 12:
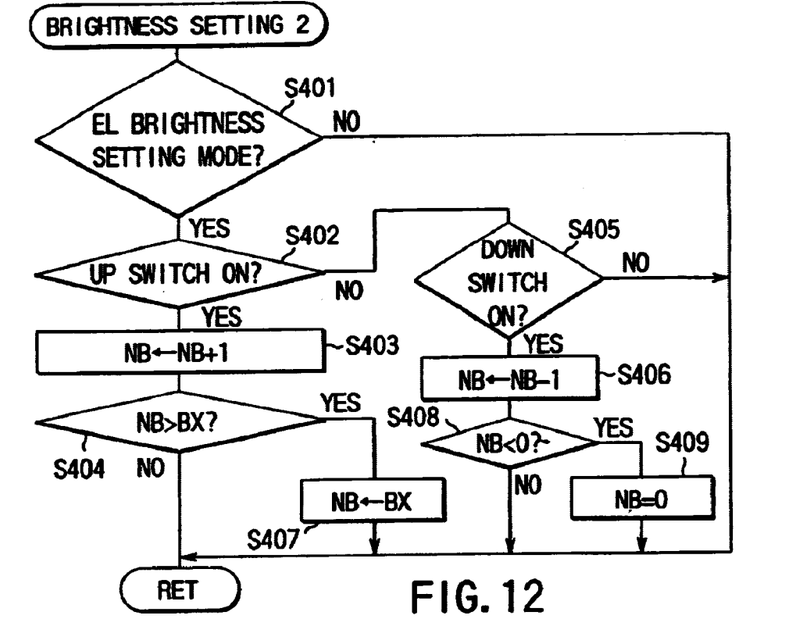
FIG. 12 is a flowchart showing a sequence for setting luminous brightness in a case where mode is switched in the order of [photographing mode]→[EL brightness setting mode]→[EL luminous color setting mode] by a mode selector switch 5.

FIG. 12 is a flowchart showing a sequence for performing luminous brightness setting in a case where the mode is switched in the order of [photographing mode]→[EL brightness setting mode]→[L luminous color setting mode].

First, the CPU 1 checks whether or not the EL brightness setting mode has been selected by the mode selector switch 5 (Step S401), and it terminates the processing when the mode is not the EL brightness setting mode. In the Step S401, when the EL brightness setting mode has been selected, the CPU 1 checks whether or not an up switch (which is another function of as the strobe switch 6) which is adjustable in a brighter direction has been input or turned on (Step S402), and it counts or increments the count value NB by +1 (Step S403).

As a result, the CPU 1 checks whether or not the NB exceeds the maximum value BX (Step S404). When the NB exceeds the maximum value BX, the CPU 1 replaces the NB with the BX to fix the NB to the maximum value and terminate the processing. When the former does not exceed the latter, the CPU 1 holds the set value to terminate the processing (Step S407).

On the other hand, in the Step S402, when the up switch is not input or turned on, the CPU 1 checks whether or not a down switch (which is another function of the self-mode switch 7) which is adjustable in a darker direction has been input or turned on (Step S405).

Here, when the input has not been performed, the CPU 1 terminates the processing and when the input has been performed, the CPU 1 decreases or decrements the count value NB by −1 (Step S406). Then, the CPU 1 checks whether or not NB has become less than 0 (Step S408). When NB has become less than 0, the CPU 1 replaces NB with 0 to fix NB to the minimum value and terminate the processing. Otherwise, the CPU 1 holds the set value to terminate the processing (Step S409).

Figure 14:
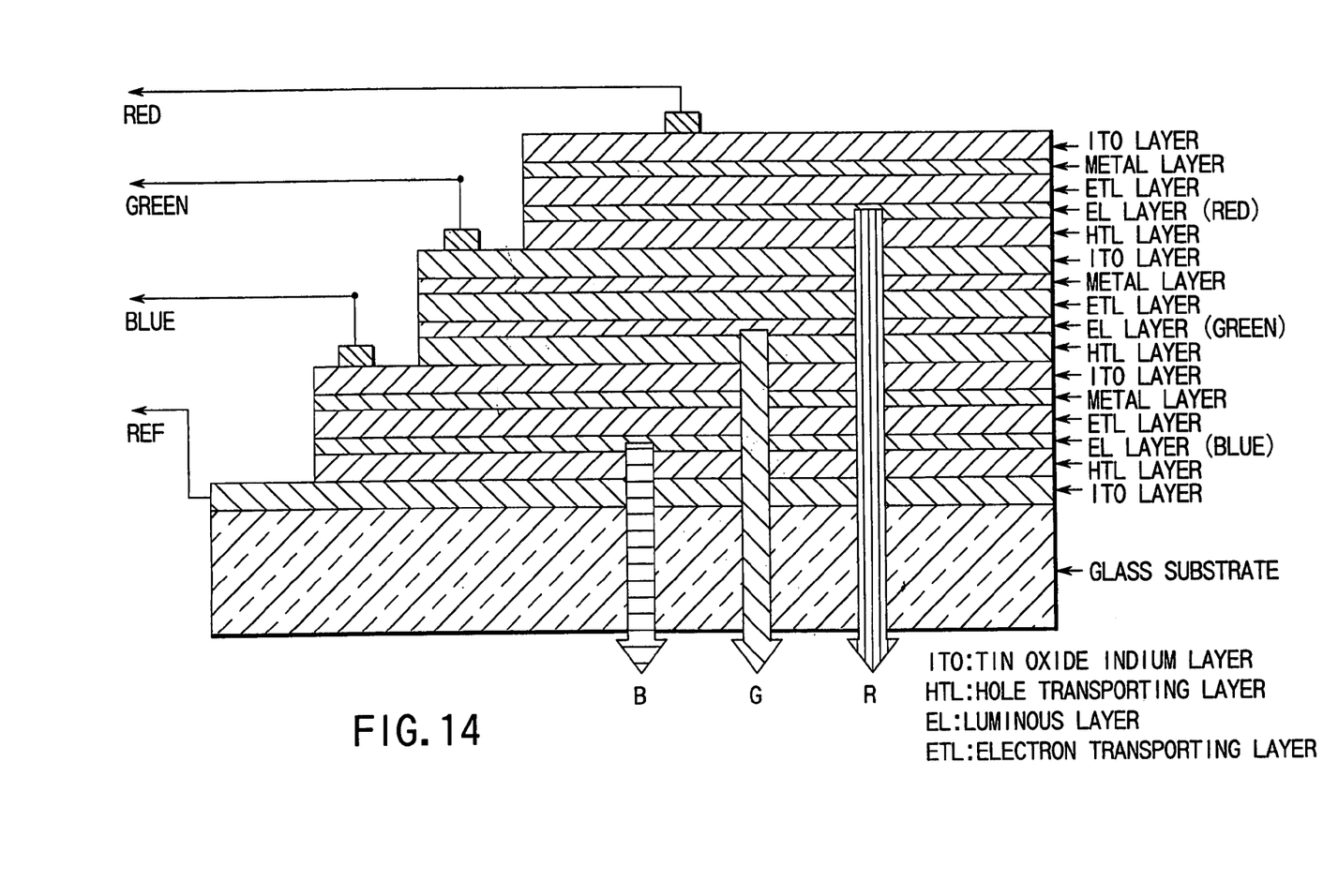
FIG. 14 is a view showing a laminated or stacked structure of an organic EL element which can emit three color lights independently from one another.
Figure 15:
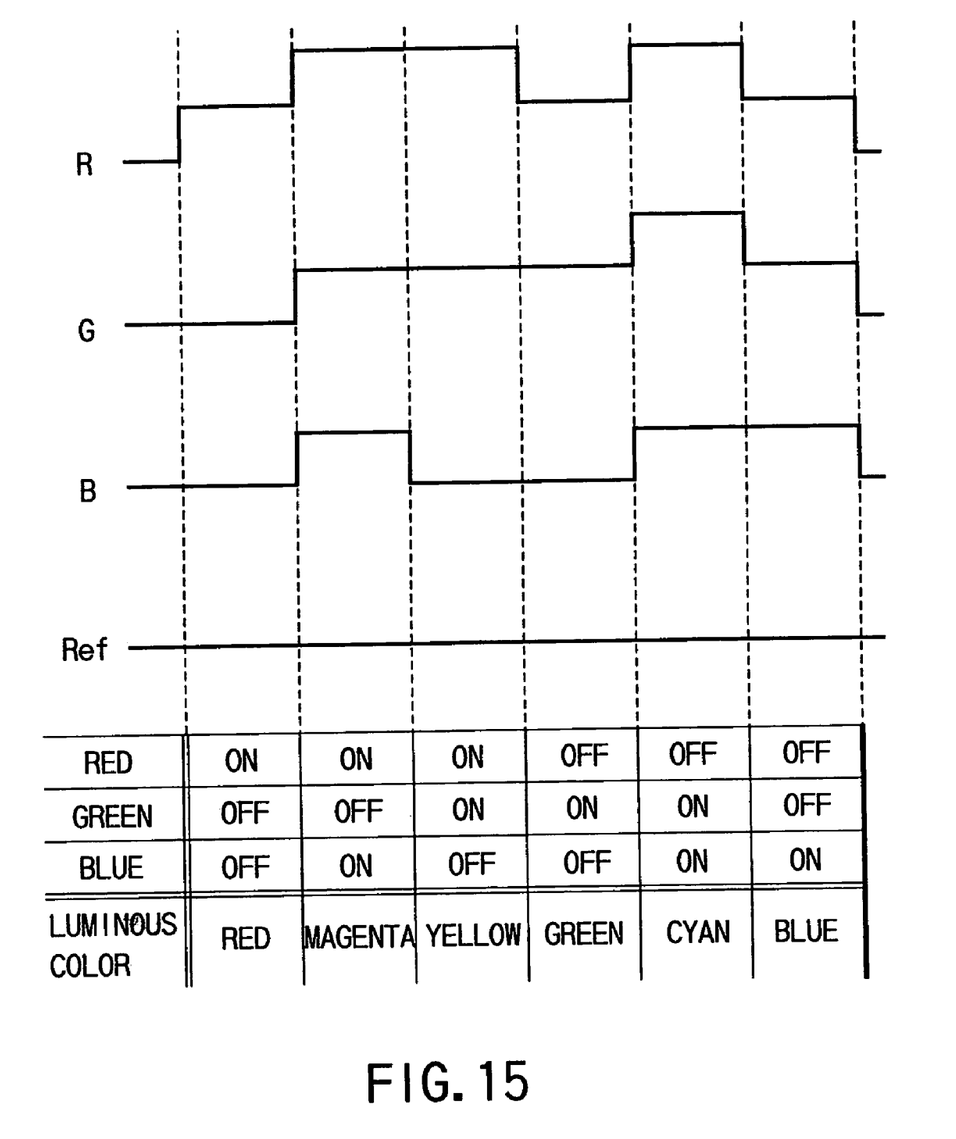
FIG. 15 is a diagram showing driving waveforms obtained when 6 kinds of lights are to be emitted by using the organic EL element shown in FIG. 14 to combine emissions of three colors.

Here, FIG. 14 is a view showing a laminated or stacked structure of an organic EL element which can emit three color lights independently. In order to emit respective color lights from the respective laminated layers, the organic EL element is structured such that bias voltages are individually applicable to respective layers. Furthermore, FIG. 15 is an example of driving waveforms obtained when the organic EL element in FIG. 14 is used to emit 6 kinds of lights by combining light emissions of three colors.

Figure 13:
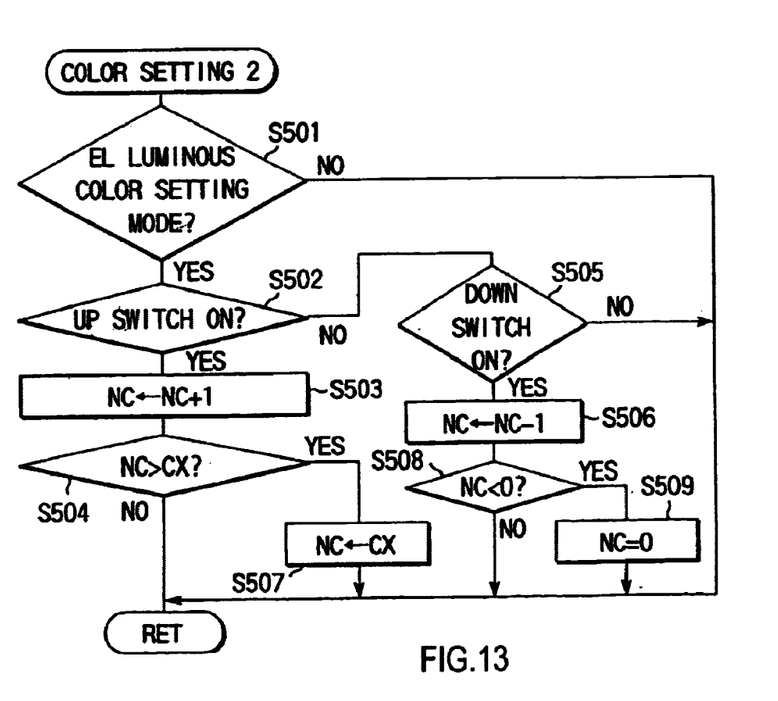
FIG. 13 is a flowchart showing a sequence for setting luminous color in a case where mode is switched in the order of [photographing mode]→[EL brightness setting mode]→[EL luminous color setting mode] by the mode selector switch 5.

Next, a sequence for performing luminous color setting in a case where mode switching is performed in the order of

[photographing mode]→[EL brightness setting mode]→[EL luminous color setting mode] will be explained with reference to a flowchart of FIG. 13.

First, the CPU 1 checks whether or not the EL luminous color setting mode has been selected by the mode selector switch 5 (Step S501). When the EL luminous color setting mode has not selected, the CPU 1 terminates the processing. When the EL luminous color setting mode has been selected, the CPU 1 checks whether or not the up switch adjustable in a direction of a red color which is a warm color system has been input (Step S502). When the input has been performed, the CPU 1 increases or increments the count value NC by +1 (Step S503). As a result, the CPU 1 checks whether or not NC exceeds the maximum value CX (Step S504). When NC exceeds the value, the CPU 1 replaces NC with CX to fix NC to the maximum value (Step S507) and terminates the processing. Otherwise, the CPU 1 holds the set value to terminate the processing.

On the other hand, in the Step S502, when the up switch has not been input, the CPU 1 checks whether or not a down switch adjustable in a direction of a cold color system has been input (Step S505). When the input has not been performed, the CPU 1 terminates the processing, and when the input has been performed, the CPU 1 decreases or decrements the count value NC by −1 (Step S506). Then, the CPU 1 checks whether or not NC has become less than 0 (Step S508). When NC has become less than 0, the CPU 1 replaces NC with 0 to fix NC to the minimum value (Step S509) and terminate the processing. Otherwise, the CPU 1 holds the set value to terminate the processing.

As stated above, in the second embodiment, since the switch for count-up only performs count-up operation and the switch for count-down only performs count-down operation, even in a case where setting levels are further finely divided, a photographer can grasp an image of the set level easily.

Also, in the second embodiment, though the organic EL element 17 is used for back light in the LCD section 14 for outside display, it is also possible to use the organic EL element 17 directly as a display segment, use it as a display in a finder, and use it on a section of a camera exterior as an accessory on a design.

As mentioned above, according to the present invention, a display device for a camera can be provided which does not give a feeling of incompatibility to a photographer, or which is easy to understand for a photographer, as he/she can set driving conditions according to a photographing environment or his/her taste.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device for a camera comprising:
   an organic electroluminescent element which emits multiple color lights for illuminating a display segment or a background of the display segment in the display device;
   driving condition setting means for changing and setting luminous brightness or luminous color of the organic electroluminescent element; and
   driving control means for driving the organic electroluminescent element on the basis of the luminous brightness or the luminous color set by the driving condition setting means wherein the luminous brightness or the luminous color in an identical area of the display device is manually changeable by an operator.

2. The display device for a camera according to claim 1, wherein the identical area is the display segment or the background of the display segment.

3. The display device for a camera according to claim 1, wherein the organic electroluminescent element has a laminated structure.

4. The display device for a camera according to claim 1, wherein the driving condition setting means includes an operation member operated manually, and the operation member also serves as another operation member for setting a photographing mode of a camera.

5. The display device for a camera according to claim 1, further comprising a mode selector member for performing switching between a setting mode for setting the luminous brightness or the luminous color of the driving condition setting means and a photographing mode of a camera,
   wherein, when the setting mode is set by the mode selector member, change in the luminous brightness or the luminous color is allowed.

6. The display device for a camera according to claim 1, wherein the luminous brightness or the luminous color is changeable by being arbitrarily selected by the operator from plural numbers of luminous brightness or plural luminous colors stored in advance.

7. The display device for a camera according to claim 1, wherein both the luminous brightness and the luminous color are changeable by the operator.

8. The display device for a camera according to claim 1, wherein luminous brightness or the luminous color of the display device, for a given camera state and camera mode, is manually changeable by an operator.

9. A display device for a camera comprising:
   an organic electroluminescent element which emits multiple color lights for illuminating a display segment or a background of the display segment in the display device;
   driving condition setting means for changing and setting luminous brightness or luminous color of the organic electroluminescent element;
   storing means for storing the luminous brightness or the luminous color set by the driving conditions setting means; and
   driving control means for driving the organic electroluminescent element on the basis of the luminous brightness or the luminous color stored in the storing means wherein the luminous brightness or the luminous color in an identical area of the display device is manually changeable by an operator.

10. The display device for a camera according to claim 9, wherein the storing means is an electrically rewritable non-volatile memory.

11. The display device for a camera according to claim 9, wherein the driving condition setting means includes an operation member operated manually, and the operation member also serves as another operation member for setting a photographing mode of a camera.

12. The display device for a camera according to claim 9, further comprising a mode selector member for performing switching between a setting mode for setting the luminous brightness or the luminous color of the driving condition setting means and a photographing mode of a camera, wherein, when the setting mode is set by the mode selector member, change in the luminous brightness or the luminous color is allowed.

13. The display device for a camera according to claim 9, wherein the identical area is the display segment or the background of the display segment.

14. The display device for a camera according to claim 9, wherein the luminous brightness or the luminous color is changeable by being arbitrarily selected by the operator from plural numbers of luminous brightness or plural luminous colors stored in advance.

15. The display device for a camera according to claim 9, wherein both the luminous brightness and the luminous color are changeable by the operator.

16. A camera comprising:
a display device for displaying a display segment;
an organic electroluminescent element which emits multiple color lights for illuminating the display segment or a background of the display segment in the display device; and
driving condition setting means for changing and setting luminous brightness or luminous color of the organic electroluminescent element,
wherein the display device displays that setting of the luminous brightness or the luminous color by the driving condition setting means is allowable, and the luminous brightness or the luminous color in an identical area of the display device is manually changeable by an operator.

17. The display device for a camera according to claim 16, wherein the identical area is the display segment or the background of the display segment.

18. The display device for a camera according to claim 16, wherein the luminous brightness or the luminous color is changeable by being arbitrarily selected by the operator from plural numbers of luminous brightness or plural luminous colors stored in advance.

19. The display device for a camera according to claim 16, wherein both the luminous brightness and the luminous color are changeable by the operator.

20. A display device for a camera comprising:
a display section for displaying a plurality of display segments;
an organic electroluminescent element which emits multiple color lights for illuminating at least one display segment out of the plurality of display segments or a background of the at least one display segment in the display device;
a driving condition setting circuit for changing and setting data corresponding to luminous brightness or luminous color of the organic electroluminescent element; and
a drive circuit for driving the organic electroluminescent element on the basis of the luminous brightness or the luminous color set by the driving condition setting circuit wherein the data corresponding to the luminous brightness or the luminous color of the at least one display segment or the background of the display segments is manually changeable by an operator.

21. The display device for a camera according to claim 20, wherein the identical area is the display segment or the background of the display segment.

22. The display device for a camera according to claim 20, wherein the organic electroluminescent element has a laminated structure.

23. The display device for a camera according to claim 20, wherein the driving condition setting circuit includes a switch circuit operated manually, and the switch circuit also serves as another switch circuit for setting a photographing mode of a camera.

24. The display device for a camera according to claim 20, further comprising a mode selector member for performing switching between a setting mode for setting the luminous brightness or the luminous color of the driving condition setting circuit and a photographing mode of a camera,
wherein, when the setting mode is set by the mode selector member, change in the luminous brightness or the luminous color is allowed.

25. The display device for a camera according to claim 20, wherein the luminous brightness or the luminous color is changeable by being arbitrarily selected by the operator from plural numbers of luminous brightness or plural luminous colors stored in advance.

26. The display device for a camera according to claim 20, wherein both the luminous brightness and the luminous color are changeable by the operator.

27. A display device for a camera comprising:
a display section for displaying a plurality of display segments;
an organic electroluminescent element which emits multiple color lights for illuminating at least one a display segment out of the plurality of display segments or a background of the at least one display segment in the display section;
a driving condition setting circuit for changing and setting data corresponding to luminous brightness or luminous color of the organic electroluminescent element;
a memory for storing the luminous brightness or the luminous color set by the driving condition setting circuit; and
a drive circuit for driving the organic electroluminescent element on the basis of the luminous brightness or the luminous color stored in the memory wherein the data corresponding to the luminous brightness or the luminous color of the at least one display segment or the background of the display segments is manually changeable by an operator.

28. The display device for a camera according to claim 27, wherein the memory is an electrically rewritable non-volatile memory.

29. The display device for a camera according to claim 27, wherein the driving condition setting circuit includes a switch circuit operated manually, and the switch circuit also serves as another switch circuit for setting a photographing mode of a camera.

30. The display device for a camera according to claim 27, further comprising a mode selector switch for performing switching between a setting mode for setting luminous brightness or the luminous color of the driving condition setting circuit and a photographing mode of a camera,
wherein, when the setting mode is set by the mode selector member, change in the luminous brightness or the luminous color is allowed.

31. The display device for a camera according to claim 27, wherein the identical area is the display segment or the background of the display segment.

32. The display device for a camera according to claim 27, wherein the luminous brightness or the luminous color is changeable by being arbitrarily selected by the operator from plural numbers of luminous brightness or plural luminous colors stored in advance.

33. The display device for a camera according to claim 27, wherein both the luminous brightness and the luminous color are changeable by the operator.

34. A camera comprising:
a display device for displaying a plurality of display segments;
an organic electroluminescent element which emits multiple color lights for illuminating at least one display segment out of the plurality of display segments or a background of the at least one display segment in the display device; and
a driving condition setting circuit for changing and setting data corresponding to luminous brightness or luminous color of the organic electroluminescent element;
wherein the display device displays that setting of the luminous brightness or the luminous color by the driving condition setting circuit is allowable, and the data corresponding to the luminous brightness or the luminous color of the at lest one display segment or the background of the display segments is manually changeable by an operator.

35. The display device for a camera according to claim 34, wherein the identical area is the display segment or the background of the display segment.

36. The display device for a camera according to claim 34, wherein the luminous brightness or the luminous color is changeable by being arbitrarily selected by the operator from plural numbers of luminous brightness or plural luminous colors stored in advance.

37. The display device for a camera according to claim 34, wherein both the luminous brightness and the luminous color are changeable by the operator.

38. A display device for a camera comprising:
a display section for displaying a plurality of display segments, the display segment including an organic EL element which has a laminated structure and emits multiple color lights for illuminating at least one a display segment out of the plurality of display segments or a background of the display at least one segment in the display section;
a first driving condition setting section for changing and setting luminous brightness of the organic EL element;
a second driving condition setting section for changing and setting luminous color of the organic EL element; and
a driving control section for driving the organic EL element on the basis of the luminous brightness set by the first driving condition setting section or the luminous color set by the second driving condition setting section,
wherein the luminous brightness and the luminous color of the at least one display segment or the background of the display segments is manually changeable by an operator.

39. The display device for a camera according to claim 38, wherein the display section includes an outside display section.

40. A display device for a camera, comprising:
a display section which emits lights for illuminating a display segment or a background of the display segment of the display section on the basis of a luminous brightness or luminous color corresponding to respective operation states of the camera, and which displays the operation states of the camera;
luminous condition setting means for changing and setting the luminous brightness or the luminous color; and
storing means for storing the luminous brightness or the luminous color in association with the respective operation states of the camera,
wherein the luminous brightness or the luminous color in an identical area of the display section is manually changeable by an operator of the camera.

41. The display device for a camera according to claim 40, wherein the identical area is the display segment or the background of the display segment.

42. The display device for a camera according to claim 41, wherein the display section is an LCD section for outside display of the camera.

43. The display device for a camera according to claim 41, wherein the display section is a part of an exterior of the camera.

44. The display device according to claim 40, wherein the display section is provided in a finder of the camera.

45. The display device for a camera according to claim 40, wherein the display section is an LCD section for outside display of the camera.

46. The display device for a camera according to claim 40, wherein the display section is a part of an exterior of the camera.

47. The display device according to claim 41, wherein the display section is provided in a finder of the camera.

48. The display device for a camera according to claim 40, wherein the luminous brightness or the luminous color is changeable by being arbitrarily selected by the operator from plural numbers of luminous brightness or plural luminous colors stored in advance.

49. The display device for a camera according to claim 40, wherein both the luminous brightness and the luminous color are changeable by the operator.

50. A display device for a camera comprising:
a luminous section for performing plural luminous displays corresponding to respective camera operation states;
driving control means for driving and controlling the luminous displays of the luminous section on the basis of luminous brightness or luminous color preset in correspondence with the respective camera operation states; and
driving condition setting means for manually and arbitrarily setting and changing the luminous brightness or the luminous color in an identical area of the luminous section.

51. The display device for a camera according to claim 50, further comprising:
driving condition storing means for storing the luminous brightness or the luminous color set and changed by the driving condition setting means.

52. The display device for a camera according to claim 51, wherein the driving condition setting means also serves as an operation member with which a photographing mode of the camera is manually set.

53. The display device for a camera according to claim 50, wherein the identical area is a display segment or a background of the display segment in the luminous section.

54. The display device for a camera according to claim 50, wherein both the luminous brightness and the luminous color are settable and changeable by an operator.

55. The display device for a camera according to claim 50, wherein the driving condition setting means also serves as an operation member with which a photographing mode of the camera is manually set.

56. The display device for a camera according to claim 50, wherein the identical area is the display segment or the background of the display segment.

57. The display device for a camera according to claim 50, wherein both the luminous brightness and the luminous color are changeable by the operator.

* * * * *